US012584296B2

(12) United States Patent
　　Tamura et al.

(10) Patent No.:　US 12,584,296 B2
(45) Date of Patent:　　Mar. 24, 2026

(54) WORK MACHINE DISPLAY CONTROL SYSTEM, WORK MACHINE DISPLAY SYSTEM, WORK MACHINE, WORK MACHINE DISPLAY CONTROL METHOD, AND WORK MACHINE DISPLAY CONTROL PROGRAM

(71) Applicant: Yanmar Holdings Co., Ltd., Osaka (JP)

(72) Inventors: Kazuki Tamura, Fukuoka (JP); Daisuke Kawaguchi, Fukuoka (JP); Shogo Suzuki, Osaka (JP)

(73) Assignee: Yanmar Holdings Co., Ltd., Osaka (JP)

( * ) Notice:　Subject to any disclaimer, the term of this patent is extended or adjusted under 35 U.S.C. 154(b) by 178 days.

(21) Appl. No.:　18/276,437

(22) PCT Filed:　Jan. 20, 2022

(86) PCT No.:　PCT/JP2022/001922
　　§ 371 (c)(1),
　　(2) Date:　Aug. 8, 2023

(87) PCT Pub. No.: WO2022/172716
　　PCT Pub. Date: Aug. 18, 2022

(65) Prior Publication Data
　　US 2024/0301663 A1　　Sep. 12, 2024

(30) Foreign Application Priority Data

Feb. 12, 2021　(JP) ................................ 2021-020877

(51) Int. Cl.
　　*E02F 9/26*　　　　(2006.01)
　　*G06F 3/147*　　　(2006.01)

(52) U.S. Cl.
　　CPC .............. *E02F 9/261* (2013.01); *E02F 9/264* (2013.01); *G06F 3/147* (2013.01)

(58) Field of Classification Search
　　CPC ................................. G06F 3/147; E02F 9/261
　　See application file for complete search history.

(56) References Cited

U.S. PATENT DOCUMENTS 10,391,940 B2　　8/2019　Izumikawa et al.
2014/0257645 A1*　9/2014　Date ...................... B60K 35/50
　　　　　　　　　　　　　　　　　　　　701/50

(Continued)

FOREIGN PATENT DOCUMENTS

EP　　　　3135827 A1　　3/2017
JP　　　2011241631 A　　12/2011

(Continued)

*Primary Examiner* — Shivang I Patel
(74) *Attorney, Agent, or Firm* — Chris Mizumoto

(57) ABSTRACT

This display control system includes a display processing unit that causes a display device to display a display screen. The display screen includes a remaining-amount display region and a switching display region. The remaining-amount display region is a region for displaying remaining-amount information, which concerns the remaining amount of an object to be monitored that is consumed with the operation of a work machine. The switching display region is a region for displaying information to be displayed which is switchably selected from among a plurality of pieces of information including at least first piece of information and second piece of information which are related to the work machine. The switching display region is arranged in a central area including the center of a display screen. The remaining-amount display region is arranged in a peripheral area located at the periphery of the central area of the display screen.

12 Claims, 10 Drawing Sheets

(56)     References Cited

U.S. PATENT DOCUMENTS

| | | | |
|---|---|---|---|
| 2016/0258134 A1 | 9/2016 | Matsumoto et al. | |
| 2017/0028919 A1* | 2/2017 | Izumikawa | ............. H04N 7/18 |
| 2021/0010243 A1 | 1/2021 | Fukuoka | |

FOREIGN PATENT DOCUMENTS

| | | | |
|---|---|---|---|
| JP | 2015209691 A | 11/2015 | |
| WO | 2015163381 A1 | 10/2015 | |

* cited by examiner

WORK MACHINE DISPLAY CONTROL SYSTEM, WORK MACHINE DISPLAY SYSTEM, WORK MACHINE, WORK MACHINE DISPLAY CONTROL METHOD, AND WORK MACHINE DISPLAY CONTROL PROGRAM

CROSS-REFERENCE

This application is a US National Stage Application under 35 U.S.C. § 371 of International Application No. PCT/JP2022/001922 filed Jan. 20, 2022, which claims foreign priority of JP2021-020877 filed Feb. 12, 2021 and the disclosures of which are hereby incorporated by reference in their entirety.

TECHNICAL FIELD

The present invention relates to a work machine display control system used to display information about a work machine, a work machine display system, a work machine, a work machine display control method, and a work machine display control program.

BACKGROUND ART

As a related art, there is known an image display device that simultaneously displays two or more kinds of images on a display device (monitor) provided to a work machine (construction machine) (for example, see Patent Literature 1). The device according to the related art displays, on the display device, a measurement data image of predetermined measuring instruments and a camera image acquired by a camera that is provided for supplementary taking a field of view of an outside. Information displayed as the measurement data image includes a cooling water temperature meter of an engine, a fuel gauge, and a hydraulic oil temperature meter, etc. Here, the display device displays the camera image and the measurement data image so that the measurement data image is superposed on the camera image and the camera image is seen through the measurement data image.

CITATION LIST

Patent Literature

Patent Literature 1: JP2005-163370

DISCLOSURE OF INVENTION

Problems to be Solved by the Invention

In the configuration of the related art described above, two kinds of separate images are superposed with each other and displayed. Therefore, in a situation in which, for example, a measurement data image having a dark collar is superposed and displayed on a dark part of the camera image, visibility of individual information (image) useful for an activation of the work machine may be decreased.

An object of the present invention is to provide a work machine display control system, a work machine display system, a work machine display control method, and a work machine display control program that can easily increase visibility of each of a variety of information relating to the work machine.

Means for Solving the Problems

A work machine display control system according to one aspect of the present invention includes a display processing portion that makes a display device display a display screen. The display screen includes a remaining-amount display region and a switching display region. The remaining-amount display region is a region that displays remaining-amount information about a remaining amount of an observation target that is consumed when the work machine is activated. The switching display region is a region that displays display target information selected from a plurality of pieces of information including at least first information and second information about the work machine so that displayed information can be switched between the plurality of pieces of information. The switching display region is disposed on a central area including a center of the display screen. The remaining-amount display region is disposed on a peripheral area that is positioned on a periphery of the central area of the display screen.

A work machine display system according to one aspect of the present invention includes the work machine display control system and the display device that displays the display screen.

A work machine according to one aspect of the present invention includes the work machine display system and a machine body to which the display device is mounted.

A work machine display control method according to one aspect of the present invention includes making a display device display a display screen including a remaining-amount display region and a switching display region. The remaining-amount display region is a region that is disposed on a peripheral area that is positioned on a periphery of a central area including a center of the display screen and displays remaining-amount information about a remaining amount of an observation target that is consumed when the work machine is activated. The switching display region is a region that is disposed on the central area of the display screen and displays display target information selected from a plurality of pieces of information including at least first information and second information about the work machine so that displayed information can be switched between the plurality of pieces of information.

A work machine display control program according to one aspect of the present invention is a program for making one or more processors make a display device display a display screen including a remaining-amount display region and a switching display region. The remaining-amount display region is a region that is disposed on a peripheral area that is positioned on a periphery of a central area including a center of the display screen and displays remaining-amount information about a remaining amount of an observation target that is consumed when the work machine is activated. The switching display region is a region that is disposed on the central area of the display screen and displays display target information selected from a plurality of pieces of information including at least first information and second information about the work machine so that displayed information can be switched between the plurality of pieces of information.

According to the present invention, there can be provided a work machine display control system, a work machine display system, a work machine, a work machine display control method, and a work machine display control program that can easily increase visibility of each of a variety of information about the work machine.

BRIEF DESCRIPTION OF DRAWINGS

FIG. 1 is a block diagram illustrating a work machine according to an embodiment 1.

FIG. 3 is a view illustrating one example of a home screen displayed by a display control system according to the embodiment 1.

FIG. 5 is a view illustrating one example of a home screen displayed by a display control system according to the embodiment 1.

FIG. 6 is a view illustrating one example of a camera screen displayed by a display control system according to the embodiment 1.

FIG. 7 is a view illustrating one example of a full display screen displayed by a display control system according to the embodiment 1.

FIG. 9 is a view illustrating one example of a home screen displayed by a display control system according to a first modified example of the embodiment 1.

DESCRIPTION OF EMBODIMENTS

Hereinafter, embodiments of the present invention are described with reference to the appended drawings. The embodiments described below are one example in which the present invention is embodied and are not intended to limit the technical scope of the present invention.

Embodiment 1

[1] General Configuration

Figure 1:
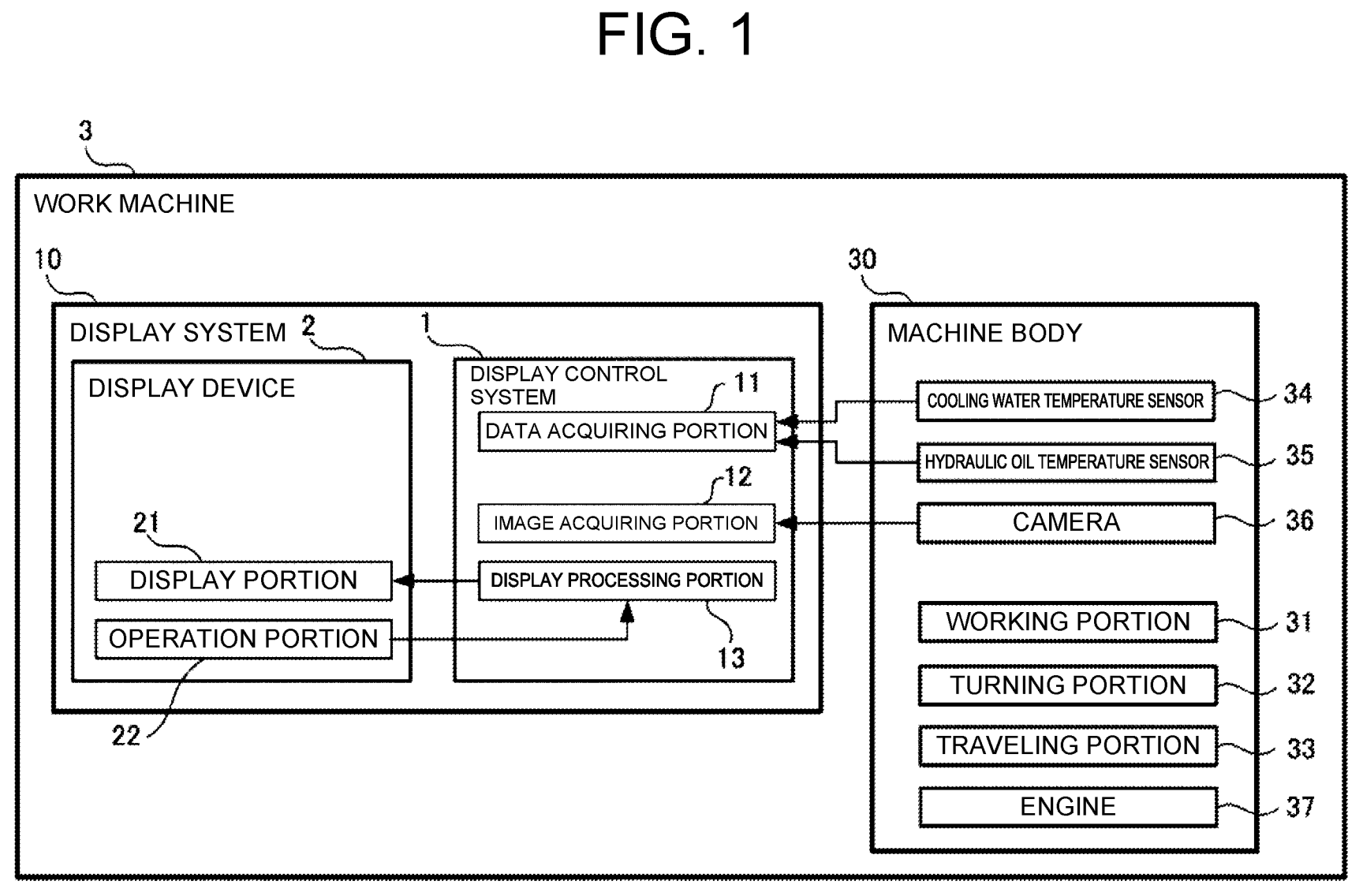
Figure 2:
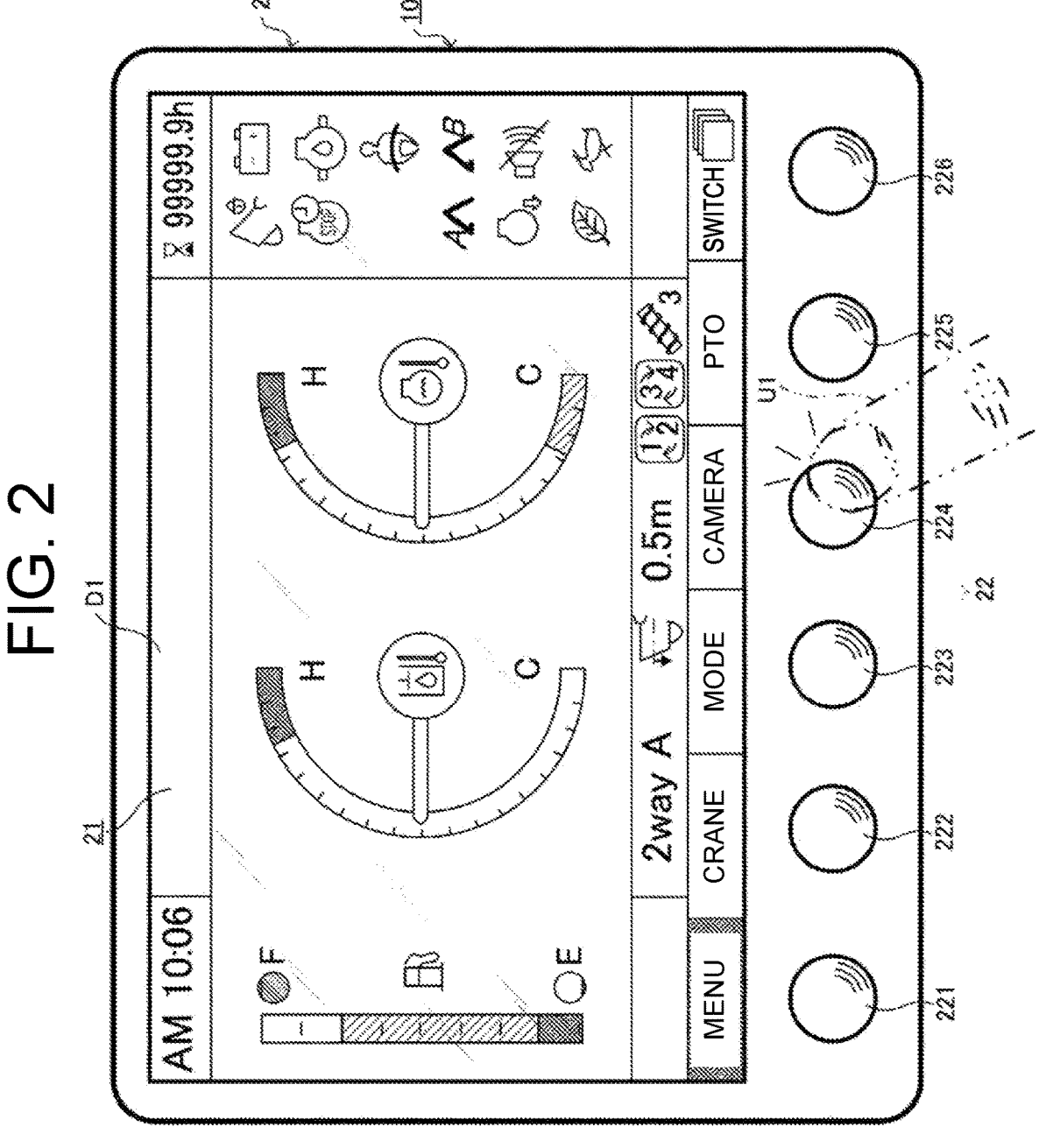
FIG. 2 is a schematic appearance view of a display system according to the embodiment 1.

As shown in FIG. 1 and FIG. 2, a work machine display control system 1 according to this embodiment (hereinafter, simply referred to as "display control system 1") is used for displaying information about a work machine 3 such as, for example, a back hoe. The display control system 1 controls a display device 2 to make the display device 2 display a display screen D1 (see FIG. 2). In this embodiment, as one example, the display device 2 is mounted to a machine body 30 of the work machine 3 and provides a variety of information by the display screen D1 to a user (operator) who operates the work machine 3. That is, a user who operates the work machine 3 can visually acquirer a variety of information about the work machine 3 by seeing the display screen D1 displayed on the display device 2.

In this embodiment, as shown in FIG. 1, the display control system 1 configures a work machine display system 10 (hereinafter, simply referred to as "display system 10") along with the display device 2. In other words, the display system 10 according to this embodiment includes the display control system 1 and the display device 2 that displays the display screen D1. Further, in this embodiment, the display system 10 configures the work machine 3 along with a machine body 30. In other words, the work machine 3 according to this embodiment includes the display system 10 and the machine body 30 to which the display device 2 is mounted.

Here, the display system 10 and the machine body 30 can communicate with each other. In this disclosure, "can communicate" means that information (data) can be transmitted and received directly, or indirectly via a communication network (network) or a repeater, etc. by an appropriate communication form of wired communication or wireless communication (communication via radio wave or light). The display system 10 and the machine body 30 can communicate with each other by a communication form such as, for example, a Controller Area Network (CAN), etc. The communication means between the display system 10 and the machine body 30 is not limited to the above-described example and is realized by an appropriate communication means. Further, it is not the necessary configuration of the display control system 1 that the display system 10 and the machine body 30 can communicate with each other.

In the work machine 3 that includes the display system 10 described above, for example, an engine 37 (see FIG. 1) actuates a hydraulic pump and the hydraulic pump supplies hydraulic oil to hydraulic actuators (including a hydraulic cylinder and a hydraulic motor, etc.) of each portion of the machine body 30, and thereby, the machine body 30 is actuated. For example, a user (operator) who sits in a driver's room of the machine body 30 operates an operation lever, etc. to control the work machine 3 described above.

Here, the display device 2 is mounted in the driver's room of the machine body 30 and a user operates the work machine 3 while seeing a variety of information about the work machine 3 displayed on the display device 2. As an example, when information about an actuation state of the work machine 3 such as a cooling water temperature and a hydraulic oil temperature, etc. is displayed on the display screen D1 of the display device 2, a user can confirm, by the display device 2, the information about the actuation state of the work machine 3 that is needed to operate the work machine 3. Further, when a camera 36 is provided to the machine body 30 of the work machine 3, a periphery image of the work machine 3 taken by the camera 36 can also be displayed on the display screen D1 of the display device 2. According to the above, when operating the work machine 3, a user can confirm, for example, a situation of the rear side, etc. of the work machine 3 that tends to be a blind spot from the driver's seat by seeing a periphery image displayed on the display device 2.

In the display control system 1 according to this embodiment, it is realized a configuration that can easily increase a visibility of each information of a variety of information about the above-described work machine 3. According to the above, for example, a work load of a user who operates the work machine 3 required to grasp a variety of information about the work machine 3 is decreased and an operability of the work machine 3 is increased, and hence, it is expected that efficiency of work using the work machine 3 is increased.

[2] Definition

A "work machine" of this disclosure means a machine for a variety of works and includes, as an example, a work vehicle such as a back hoe (including hydraulic excavator, compact excavator, etc.), a wheel loader, and a carrier, etc. The work machine 3 is not limited to a "vehicle" and may be, for example, a working ship and a working flying object such as a drone or a multi-copter, etc. Further, the work machine 3 is not limited to a construction machine (construction equipment) and may be, for example, an agricultural machine (agricultural equipment) such as a rice trans planter, a tractor, or a combine, etc. In this embodiment, unless otherwise noted, there is shown and explained an example in which the work machine 3 is a riding-type back hoe that can conduct work such as excavation work, ground leveling work, groove excavation work, or loading work, etc.

A "screen" such as the display screen D1 in this disclosure means a video (image) displayed by the display device 2 and includes a pictogram, a figure, a photograph, a text, and a movie, etc. That is, the display control system 1 can make the display device 2 display the display screen D1 including a pictogram, etc. indicating information about an actuation state of the work machine 3 such as a cooling water temperature and a hydraulic oil temperature, etc. Here, when the display screen D1 includes a movie, etc., the display screen D1 includes not a fixed video but a video that changes at every moment.

[3] Machine Body

Next, the configuration of the machine body 30 of the work machine 3 is explained with reference to FIG. 1. The work machine 3 includes a working portion 31, a turning portion 32, and a traveling portion 33 in the machine body 30. In this embodiment, the machine body 30 further includes a cooling water temperature sensor 34, a hydraulic oil temperature sensor 35, a camera 36, and an engine 37, etc.

The working portion 31 is supported by the turning portion 32 and conducts work. The turning portion 32 is positioned above the traveling portion 33 and is configured to be rotatable with respect to the traveling portion 33 about a rotation axis along a vertical direction. The traveling portion 33 is configured to be capable of traveling (including turning) on the ground. In this embodiment, since it is assumed that the work machine 3 is a riding-type back hoe as described above, the working portion 31 is activated according to an operation by a user (operator) who sits in the driver's room and conducts work such as excavation work, etc. The driver's room (for example, a cabin) in which a user (operator) sits is provided to the turning portion 32.

The working portion 31 includes a boom, an arm, a bucket, and a hydraulic actuator (including a hydraulic cylinder and a hydraulic motor, etc.), etc. Here, the working portion 31 receives motive power from the engine 37 (motive power source) and moves. Specifically, a hydraulic pump is actuated by the engine 37 and the hydraulic pump supplies hydraulic oil to a hydraulic actuator of the working portion 31, and thereby, the working portion 31 actuates.

The turning portion 32 includes a hydraulic motor (hydraulic actuator) for turning, etc. The engine 37, etc. is mounted to the turning portion 32 in addition to the driver's room. The traveling portion 33 includes, for example, a pair of left and right crawlers, and a hydraulic motor (hydraulic actuator) for traveling, etc. Similarly to the working portion 31, each of the turning portion 32 and the traveling portion 33 receives motive power from the engine 37 (motive power source) and actuates. That is, the hydraulic pump supplies hydraulic oil to the hydraulic actuator (hydraulic motor) of each of the turning portion 32 and the traveling portion 33, and thereby, the turning portion 32 and the traveling portion 33 actuates.

As described above, the engine 37 functions as a motive power source that supplies motive power to each portion. In this embodiment, as an example, the engine 37 is a diesel engine. The engine 37 is supplied with a fuel (in this case, light oil) from a fuel tank, and thereby, activates. The fuel tank includes a remaining amount sensor that senses a remaining amount of fuel. The remaining amount sensor outputs an electric signal (sensor signal) corresponding to the sensed remaining amount of fuel.

The cooling water temperature sensor 34 is a sensor that senses a temperature of cooling water (cooling water temperature) in a radiator. The hydraulic oil temperature sensor 35 is a sensor that senses a temperature of hydraulic oil (hydraulic oil temperature) supplied from the hydraulic pump to the hydraulic actuator of each portion of the machine body 30. Both of the cooling water temperature sensor 34 and the hydraulic oil temperature sensor 35 are provided to the machine body 30 and each outputs an electric signal (sensor signal) corresponding to a sensed temperature (cooling water temperature, hydraulic oil temperature).

The camera 36 has a function of taking a periphery image of the work machine 3. The camera 36 is, for example, provided to the turning portion 32 and is configured to be capable of taking a periphery image (at least one direction of front, rear, left, right, up, and down) of the work machine 3. An image taken by the camera 36 may be any one of a monochromatic image, an infrared image, and a full collar image, and may be any one of a static image and a movie. In this embodiment, as one example, the camera 36 takes an image of a rear side (periphery image) of the work machine 3 as a full collar movie and outputs an image data of the periphery image in real time.

Further, in addition to the above-described configuration, the machine body 30 further includes an Electronic Control Unit (ECU), a communication terminal, a fuel tank, and a buttery, etc. In addition, the machine body 30 also includes a revolution meter that measures a number of revolutions of the engine 37, an hour meter that measures hours of actuation, and another sensor for sensing states of a cutoff lever, a gate lock lever, and a starter key switch, etc. or for sensing a kind of an attachment that is mounted to the working portion 31, etc.

[4] Display System

Next, the configuration of the display system 10 is explained in detail with reference to FIG. 1 and FIG. 2. As described above, the display system 10 includes the display control system 1 and the display device 2. In this embodiment, as one example, the display control system 1 and the display device 2 are housed in a single housing, and all functions of the display system 10 are aggregated in the single housing as shown in FIG. 2.

The display system 10 in which the display control system 1 and the display device 2 are aggregated as described above is mounted in the driver's room of the machine body 30. According to the above, a user (operator) can visually confirm the display screen D1 displayed on the display device 2 and can operate the display device 2 as necessary.

As shown in FIG. 1 and FIG. 2, the display device 2 includes a display portion 21 and an operation portion 22. The display device 2 is configured to be capable of communicating with the display control system 1 and is capable of transmitting and receiving data to and from the display control system 1. In this embodiment, as one example, the display device 2 is a dedicated device used for the work machine 3.

The display portion 21 is a user interface for presenting information to a user (operator) such as a liquid crystal display or an organic EL display that displays a variety of information. The display portion 21 provides a variety of information to a user by displaying the information. In this embodiment, as one example, the display portion 21 is a full collar liquid crystal display having a back light and, as shown in FIG. 2, includes a "widescreen" display region that is longer in a lateral direction.

The operation portion 22 is a user interface for accepting an input operation conducted by a user (operator) to the display screen D1 displayed on the display portion 21. The operation portion 22 accepts a variety of operation by a user by, for example, outputting an electric signal according to the operation by the user. In this embodiment, as one example, the operation portion 22 includes a plurality of (in this case, 6) mechanical-type push switches 221 to 226 as shown in FIG. 2. The plurality of push switches 221 to 226 are disposed close to (in an example shown in FIG. 2, below) the display region of the display portion 21 along an edge of the display region. The plurality of push switches 221 to 226 respectively correspond to items displayed on the display screen D1 described below and, when any one of the plurality of push switches 221 to 226 is operated, the corresponding item on the display screen D1 is operated (selected).

Further, the operation portion 22 may include a touch panel and an operation dial, etc. Also in this case, any one of items on the display screen D1 is operated (selected) by an operation of the operation portion 22.

As shown in FIG. 1, the display control system 1 includes a data acquiring portion 11, an image acquiring portion 12, and a display processing portion 13. The display control system 1 is configured to be capable of communicating with the machine body 30 and, for example, can receive output of the cooling water temperature sensor 34 and the hydraulic oil temperature sensor 35 (sensor signal), output of the camera 36 (image data of periphery image), and output of another sensor, etc., from the machine body 30. Here, the display control system 1 may acquire the above-described information (data) directly from the cooling water temperature sensor 34, the hydraulic oil temperature sensor 35, and the camera 36, etc., or may acquire the information via an electronic control unit of the machine body 30.

The data acquiring portion 11 regularly or irregularly acquires a variety of data including output from the cooling water temperature sensor 34 (sensor signal) and output from the hydraulic oil temperature sensor 35 (sensor signal), etc. from the machine body 30. That is, the data acquiring portion 11 acquires a sensing result (sensed value) from a variety of sensors including data indicating a temperature of cooling water of the engine 37 (cooling water temperature) and a temperature of hydraulic oil (hydraulic oil temperature). In this embodiment, the data acquiring portion 11 also acquires output from the remaining amount sensor (sensor signal), that is, data indicating a remaining amount of fuel, from the machine body 30. The data acquired in the data acquiring portion 11 is, for example, stored in a memory, etc.

The image acquiring portion 12 regularly or irregularly acquires output of the camera 36 (image data of periphery image) from the machine body 30. That is, the image acquiring portion 12 acquires a periphery image of the work machine 3 (in this embodiment, image of rear side of the work machine 3). The data acquired in the image acquiring portion 12 is, for example, stored in a memory, etc.

The display processing portion 13 is mainly configured by a computer system including one or more processors such as a Central Processing Unit (CPU), etc. and one or more memories such as a Read Only Memory (ROM) and a Random Access Memory (RAM), etc., and conducts a variety of processes (information processing). The display processing portion 13 has a function of making the display device 2 display at least the display screen D1. Specifically, the display processing portion 13 creates the display screen D1 based on data acquired in the data acquiring portion 11 and the image acquiring portion 12, and controls the display device 2 to make the display portion 21 of the display device 2 display the display screen D1. Further, the display processing portion 13 activates according to an operation received in the operation portion 22 of the display device 2.

[5] Display Control Method

Hereinafter, with reference to FIG. 3 to FIG. 8, one example of a work machine display control method (hereinafter, simply referred to as "display control method") mainly conducted by the display control system 1 is displayed. That is, the display control method according to this embodiment includes making the display device 2 display the display screen D1 described below (processing).

The display control method according to this embodiment is conducted in the display control system 1 mainly configured by a computer system. In other words, this display control method is embodied by a work machine display control program (hereinafter, simply referred to as "display control program"). That is, the display control program according to this embodiment is a computer program for making one or more processors conduct each process according to the display control method. The display control program according to this embodiment is a program for making one or more processors conduct making the display device 2 display the display screen D1 explained below (processing). The display control program as described above may be, for example, conducted by a cooperation of the display control system 1 and the display device 2.

Here, the display control system 1 conducts each of below-described processes according to the display control method when a preset certain start operation for executing the display control program is conducted. The start operation is, for example, an activating operation of the engine 37 of the work machine 3, etc. On the other hand, the display control system 1 ends each of below-described processes according to the display control method when a preset certain end operation is conducted. The end operation is, for example, a stop operation of the engine 37 of the work machine 3, etc.

[5.1] Display Screen

Here, a configuration of the display screen D1 displayed on the display portion 21 of the display device 2 by the display control method is firstly explained. In the figure showing the display screen D1 displayed on the display portion 21 of the display device 2 such as that shown in FIG. 3, an alternate long and short dash line that indicates a region, a leader line, and reference numerals are attached merely for explanation and, in practice, are not displayed on the display device 2. Further, while a "point" indicating a center C1 of the display screen D1 is shown in FIG. 3, this "point" is also an imaginary point that is practically not displayed on the display device 2.

Figure 3:
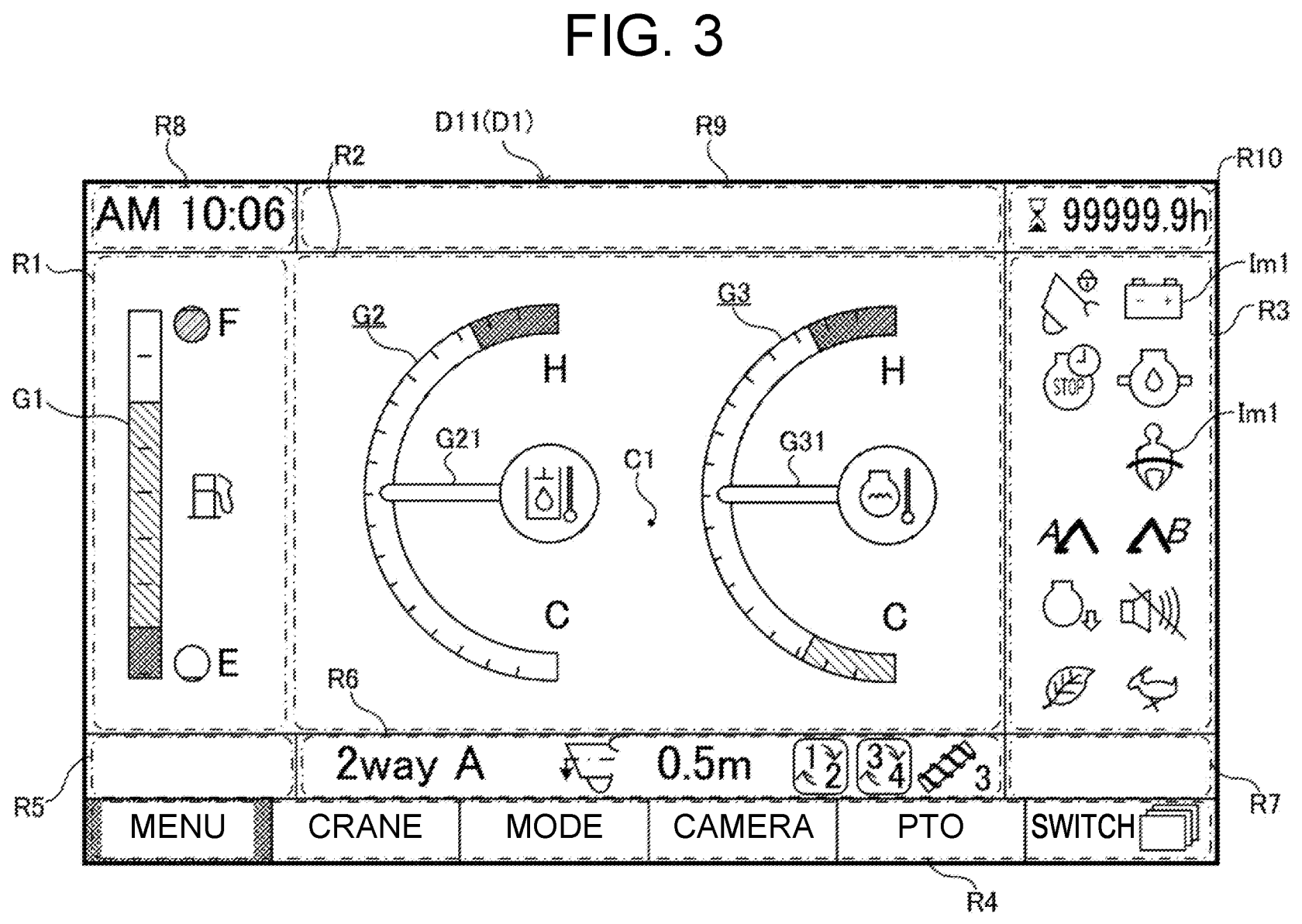

The display screen D1 shown in FIG. 3 is a home screen D11 that is firstly displayed by the display control method. The home screen D11 is a basic display screen D1 that is to be firstly displayed on the display device 2 when the work machine 3 is activated. The display screen D1 can be shifted from the home screen D11 to a variety of display screen D1 including a camera screen D12 (see FIG. 4), a full display screen D13 (see FIG. 4), a menu screen, a crane screen, a mode screen, and a PTO screen, etc. according to an operation of the operation portion 22.

As shown in FIG. 3, the home screen D11 as the display screen D1 includes a remaining-amount display region R1 (first region) and a switching display region R2 (second region). The home screen D11 further includes a third region R3, a fourth region R4, a fifth region R5, a sixth region R6, a seventh region R7, an eighth region R8, a ninth region R9, and a tenth region R10.

Specifically, the home screen D11 is divided in a longitudinal direction (up-down direction) into four regions. Then, each of top three regions is further divided in a lateral direction (left-right direction) into three regions. According to the above, the home screen D11 is divided into ten regions in total. Further, the second regions from the top include, in a sequential order from the left, the remaining-amount display region R1, the switching display region R2, and the third region R3. The bottom most region is the fourth region R4. Further, the third regions from the top include, in a sequential order from the left, the fifth region R5, the sixth region R6, and the seventh region R7. The top most regions include, in a sequential order from the left, the eighth region R8, the ninth region R9, and the tenth region R10. The second regions from the top (the remaining-amount display region R1, the switching display region R2, and the third region R3) have the longest size in the longitudinal direction among the four regions divided in the longitudinal direction. The center regions (the switching display region R2, the sixth region R6, and the ninth region R9) have the longest size in the lateral direction among the three regions divided in the lateral direction.

Note that the positions and the sizes of these regions are merely an example and can be appropriately changed. Further, it is not necessary that the regions are clearly divided by boundary lines. For example, in an example shown in FIG. 3, the switching display region R2 and the third region R3 are clearly divided from each other by a boundary line and, on the other hand, there is no boundary line between the remaining-amount display region R1 and the switching display region R2. There is no doubt that the remaining-amount display region R1 and the switching display region R2 may be clearly divided by a boundary line.

The remaining-amount display region R1 is a region having a rectangular shape that is longer in the longitudinal direction. The remaining-amount display region R1 displays remaining-amount information G1 about a remaining amount of an observation target. Here, the observation target is an object (including a liquid and a gas) that is consumed when the work machine 3 is activated. In this embodiment, as one example, the observation target includes fuel of the engine 37 (for example, light oil). That is, the remaining-amount display region R1 displays remaining-amount information G1 about a remaining amount of fuel (observation target). The display processing portion 13 generates the remaining-amount information G1 in the display screen D1 (home screen D11) based on output (sensor signal) of the remaining amount sensor acquired in the data acquiring portion 11.

In this embodiment, the remaining-amount information G1 is a bar graph. That is, the remaining-amount information G1 is information that is a value of the remaining amount of the observation target (in this case, fuel) represented by the length (height) of the bar graph. According to the remaining-amount information G1 represented by the graph (bar graph), there is a benefit that the remaining-amount information G1 has good visibility for a user and the remaining amount of the observation target can be instinctively understood by a user. It is sufficient that the remaining-amount information G1 is information about a remaining amount of the observation target. The remaining-amount information G1 is not limited to information indicating the remaining amount itself by a value, etc., and may be, for example, information indicating the remaining amount step-by-step by a pattern of pictogram (icon), etc. and information indirectly indicating the remaining amount by indicating the consumed amount of the observation target, etc.

The switching display region R2 is a region having a rectangular shape that is longer in the lateral direction. The switching display region R2 displays display target information. Here, the display target information is information selected from a plurality of pieces of information including at least first information and second information about the work machine 3 so that displayed information can be switched between the plurality of pieces of information. In an example of FIG. 3, the switching display region R2 displays cooling water temperature information G3 and hydraulic oil temperature information G2. The cooling water temperature information G3 and the hydraulic oil temperature information G2 are the first information about the work machine 3. That is, the home screen D11 shown in FIG. 3 is the display screen D1 in a situation in which the first information (the cooling water temperature information G3 and the hydraulic oil temperature information G2) is displayed as the display target information on the switching display region R2. Both of the cooling water temperature information G3 and the hydraulic oil temperature information G2 are information about the work machine 3 and, in particular, information about the actuation state of the work machine 3.

That is, the information about the actuation state of the work machine 3 can be displayed as the first information on the switching display region R2. The display processing portion 13 generates the cooling water temperature information G3 on the display screen D1 (home screen D11) based on output (sensor signal) of the cooling water temperature sensor 34 acquired in the data acquiring portion 11. Similarly, the display processing portion 13 generates the hydraulic oil temperature information G2 on the display screen D1 (home screen D11) based on output (sensor signal) of the hydraulic oil temperature sensor 35 acquired in the data acquiring portion 11.

In this embodiment, the cooling water temperature information G3 and the hydraulic oil temperature information G2 are each displayed as a graph that simulates an analog meter. In the analog meters, needles G21 and G31 rotate and values are indicated by the positions of the needles G21 and G31. That is, the cooling water temperature information G3 is information that is a value of the cooling water temperature included in the actuation state of the work machine 3 that is indicated by the position of the needle G31 of the graph. Similarly, the hydraulic oil temperature information G2 is information that is a value of the hydraulic oil temperature included in the actuation state of the work machine 3 that is indicated by the position of the needle G21 of the graph. According to the cooling water temperature information G3 and the hydraulic oil temperature information G2 represented by the graphs, there is a benefit that the cooling water temperature information G3 and the hydraulic oil temperature information G2 have good visibility for a user and the actuation state of the work machine 3 can be instinctively understood by a user. The cooling water temperature information G3 and the hydraulic oil temperature information G2 are not limited to information indicating the cooling water temperature and the hydraulic oil temperature by values, etc., and may be, for example, information, etc. indicating the cooling water temperature and the hydraulic oil temperature step-by-step by a pattern of pictogram (icon), etc.

In short, in this embodiment, the first information is information about the actuation state of the work machine 3. According to the above, a user can grasp the actuation state of the work machine 3 from the first information displayed on the switching display region R2 of the display screen D1. Further, in this embodiment, the first information is information that indicates a value about the actuation state. Therefore, a user can specifically grasp the actuation state of the work machine 3.

By the way, the display target information displayed on the switching display region R2 is information selected from a plurality of pieces of information including first information and second information so that displayed information can be switched between the plurality of pieces of information, and is not limited to the above-described first information (the cooling water temperature information G3 and the hydraulic oil temperature information G2). That is, the second information about the work machine 3 that is different from the first information can be displayed on the switching display region R2 instead of the first information.

In this embodiment, the periphery image G4 taken by the camera 36 (see FIG. 6), etc. is included as one example of the second information. That is, the second information is information including a periphery image of the work machine 3. As described above, when the display target information displayed on the switching display region R2 is switched between a plurality of pieces of information including the first information and the second information, for example, information that is needed by a user can be preferentially displayed on the display screen D1 depending on the situation.

The third region R3 is a region having a rectangular shape that is longer in the longitudinal direction. A pictogram (icon) Im1 according to an actuation state of each part of the work machine 3 is displayed on the third region R3. A plurality of pictograms Im1 can be displayed on the third region R3. The design (pattern) of each of the plurality of pictograms Im1 corresponds to, for example, a battery, a seat belt, a cooling water temperature, a hydraulic oil temperature, etc. and the situation of corresponding observation target is indicated. Here, each of the pictograms Im1 indicates the actuation state by a displaying form such as, for example, a display color or a size, etc. The display processing portion 13 uses output of a variety of sensors (including the cooling water temperature sensor 34 and the hydraulic oil temperature sensor 35) that sense an actuation state of each part of the work machine 3, and determines the state of each part of the work machine 3. Then, when an abnormal value is sensed in any part of the work machine 3, the display processing portion 13 displays a warning by changing the display form such as the display color of the pictogram Im1 of the part from which the abnormal value is sensed.

The fourth region R4 is a belt-shaped region that extends across the full width of the display screen D1. Items for operation of the display screen D1 are shown in the fourth region R4. In FIG. 3, as one example, six items of "MENU," "CRANE," "MODE," "CAMERA," "PTO," and "SWITCH" are aligned in this order from the left in the fourth region R4. These six items respectively correspond to six push switches 221 to 226 of the operation portion 22 positioned light below these items. For example, the item of "MENU" corresponds to the push switch 221 and the item of "CRANE" corresponds to the push switch 222. Therefore, for example, when the push switch 224 corresponding to the item of "CAMERA" is operated by a user U1 (see FIG. 2), the item of "CAMERA" is operated (selected).

Further, in this embodiment, one of the items in the fourth region R4 is highlighted correspondingly to an operation of an operation dial (or a cursor key) of the operation portion 22. In the example shown in FIG. 3, the item of "MENU" is highlighted, and the item that is highlighted is switched between the items by an operation of the operation dial (or a cursor key), etc. The user U1 can select a desired item by operating a decision button while the desired item is being highlighted. Therefore, for example, when the item that is highlighted is switched to the item of "CAMERA" and the decision button is operated while the item of "CAMERA" is being highlighted, the item of "CAMERA" is operated (selected). Further, when the operation portion 22 includes a touch panel, the user U1 can select a desired item by an operation of touching the desired item on the display screen D1.

The fifth region R5 displays below-described providing information Im2 (see FIG. 5). The sixth region R6 displays, for example, information about the working portion 31 activating on the work machine 3. The seventh region R7 displays, for example, information about the actuation state of the work machine 3 such as a number of revolutions of the engine 37 (see FIG. 5), etc. The eighth region R8 displays, for example, a current time. The ninth region R9 displays, for example, information indicating items to which the currently displayed display screen D1 belongs. The tenth region R10 displays, for example, information about the hours of activation of the work machine 3 (hour meter).

In the above-described display screen D1 (home screen D11), the switching display region R2 is disposed on the central area including the center C1 of the display screen D1. That is, as shown in FIG. 3, when the central area including the center C1 of the display screen D1 (that is the same area as that of the switching display region R1) is defined in the display screen D1, the display target information selected from a plurality of pieces of information including the first information and the second information so that displayed information can be switched between the plurality of pieces of information is displayed on the central area. On the other hand, the remaining-amount display region R1 is disposed on the peripheral area that is positioned on the periphery of the central area of the display screen D1. That is, as shown in FIG. 3, when a central area including the center C1 of the display screen D1 is defined on the display screen D1, the remaining-amount information G1 is displayed on the peripheral area that is close to an edge of the display screen D1.

In short, the display control system 1 according to this embodiment includes the display processing portion 13 that makes the display device 2 display the display screen D1. The display screen D1 includes the remaining-amount display region R1 and the switching display region R2. The remaining-amount display region R1 is a region that displays the remaining-amount information G1 about a remaining amount of an observation target that is consumed by an activation of the work machine 3. The switching display region R2 is a region that displays display target information selected from a plurality of pieces of information including at least the first information and the second information about the work machine 3 so that displayed information can be switched between the plurality of pieces of information. The switching display region R2 is disposed on a central area including the center C1 of the display screen D1. The remaining-amount display region R1 is disposed on the peripheral area that is positioned on the periphery of the central area of the display screen D1.

According to the above-described configuration, the remaining-amount information G1 that is preferable to be always displayed on the display screen D1 can be easily displayed on the edge of the display screen D1 (peripheral area) without overlapping with another displayed information. On the other hand, for example, the first information such as the cooling water temperature information G3 and the hydraulic oil temperature information G2 is displayed on the center (central area) of the display screen D1, and therefore, information that is preferential when the work machine 3 is activated can be easily displayed on the position that has particularly good visibility. In addition, since information that is displayed on the switching display region R2 can be switched, it is possible to switch the information that is displayed on the position having good visibility (central area) depending on the situation. Therefore, there is a benefit that, in the display control system 1 according to this embodiment, a visibility of each of a variety of information about the work machine 3 can be easily increased.

Figure 4:
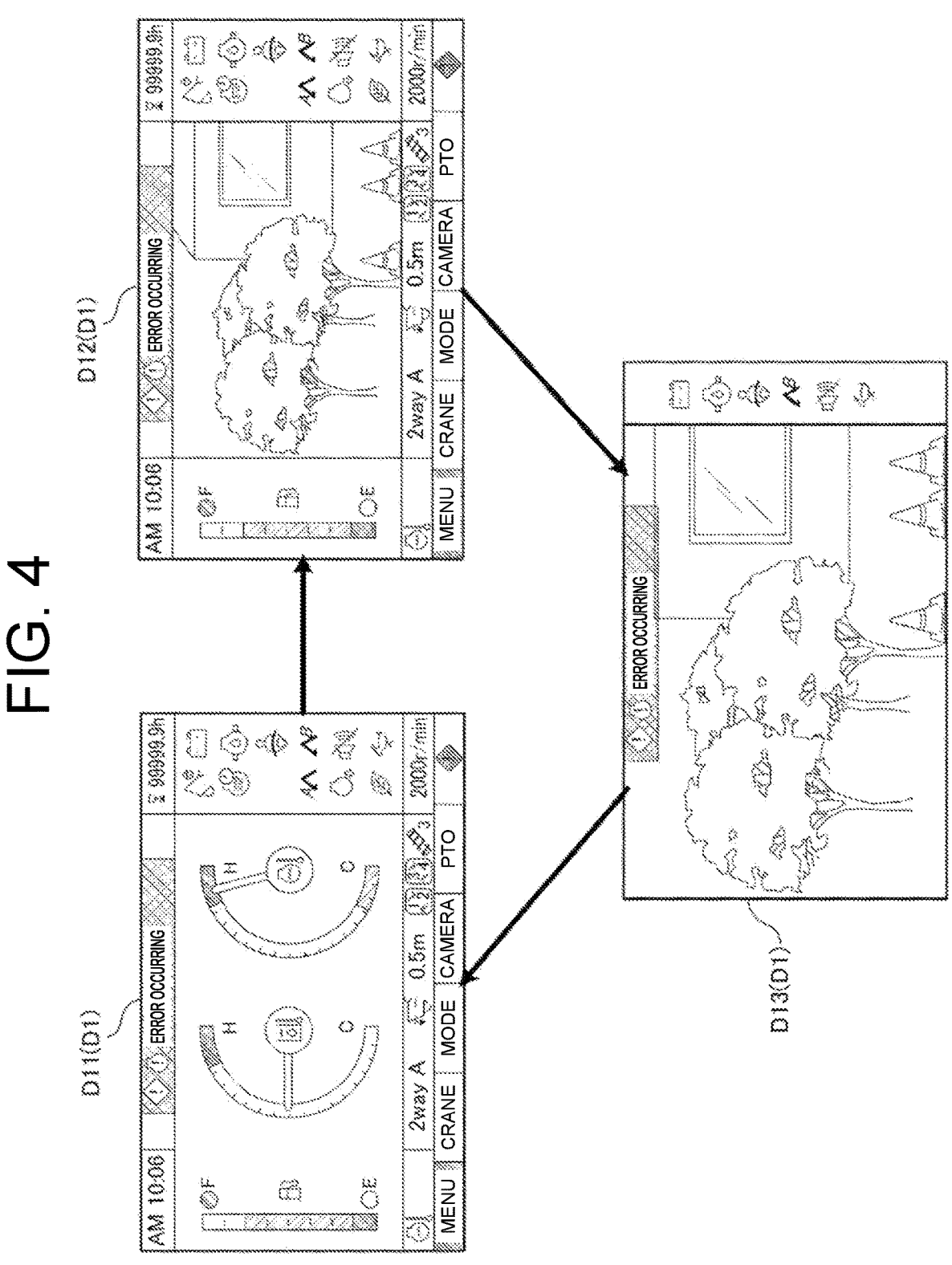
FIG. 4 is a concept view illustrating a situation in which a display screen displayed by a display control system according to the embodiment 1 is shifted.

By the way, as shown in FIG. 4, the display processing portion 13 can shift the display screen D1 displayed on the display device 2 from the home screen D11 to another screen (camera screen D12, full display screen D13, etc.) according to an operation of a user.

Here, as one example and as shown in FIG. 4, the home screen D11 is firstly displayed on the display portion 21 of the display device 2 by a start operation. Then, when an operation of the push switch 224 corresponding to the item of "CAMERA," etc. is conducted while the home screen D11 is being displayed and hence, the item of "CAMERA" is operated (selected), the display screen D1 is shifted from the home screen D11 to the camera screen D12. When the item of "CAMERA" is operated (selected) while the camera screen D12 is being displayed, the display screen D1 is shifted from the camera screen D12 to the full display screen D13. Further, when any one of the items is operated (selected) while the full display screen D13 is being displayed, the display screen D1 is shifted from the full display screen D13 to the home screen D11. Note that the operation shifting of the display screen D1 and an order of shifting, etc. are not limited to the above-described example, and can be appropriately changed.

Figure 5:
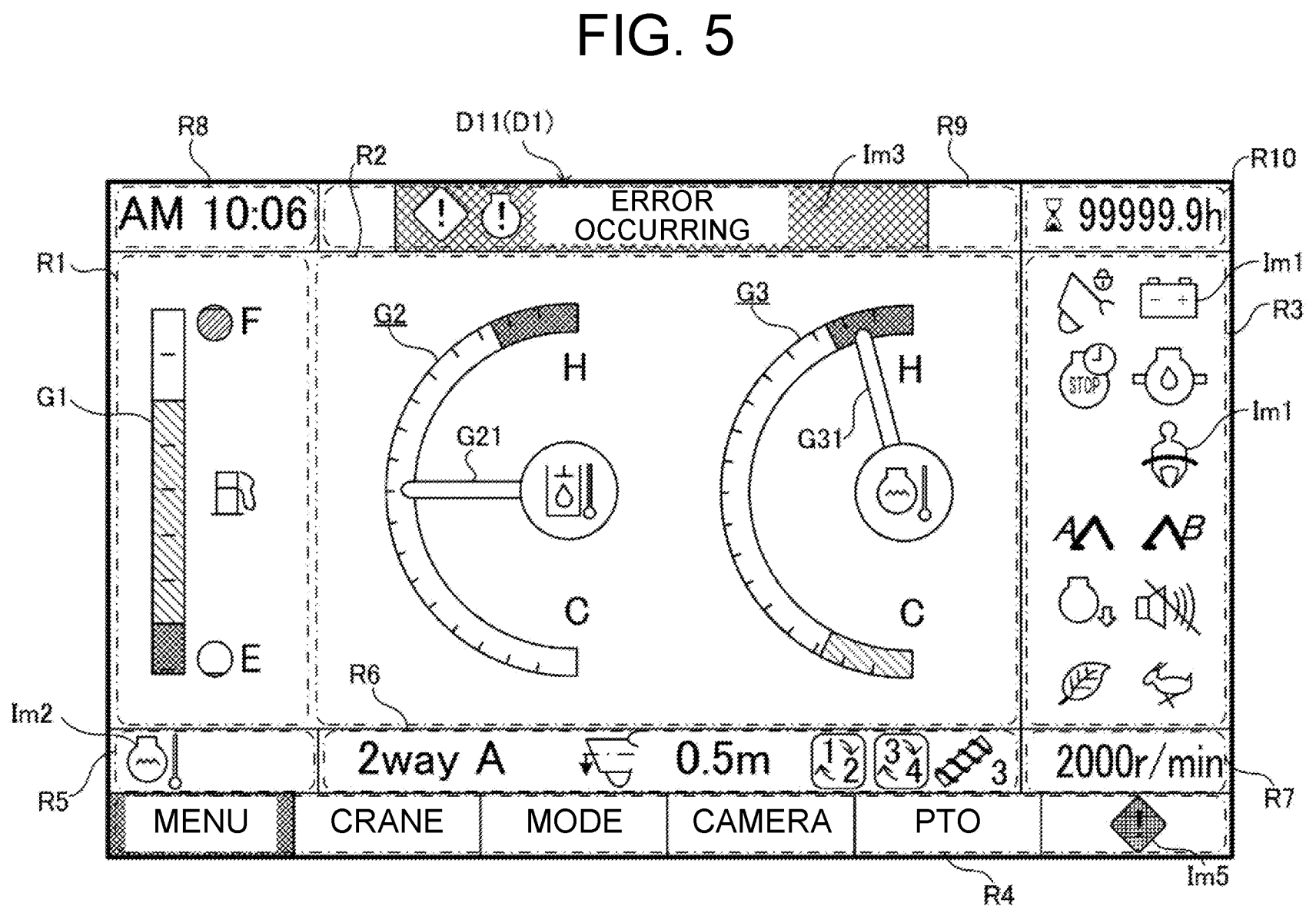
Figure 6:
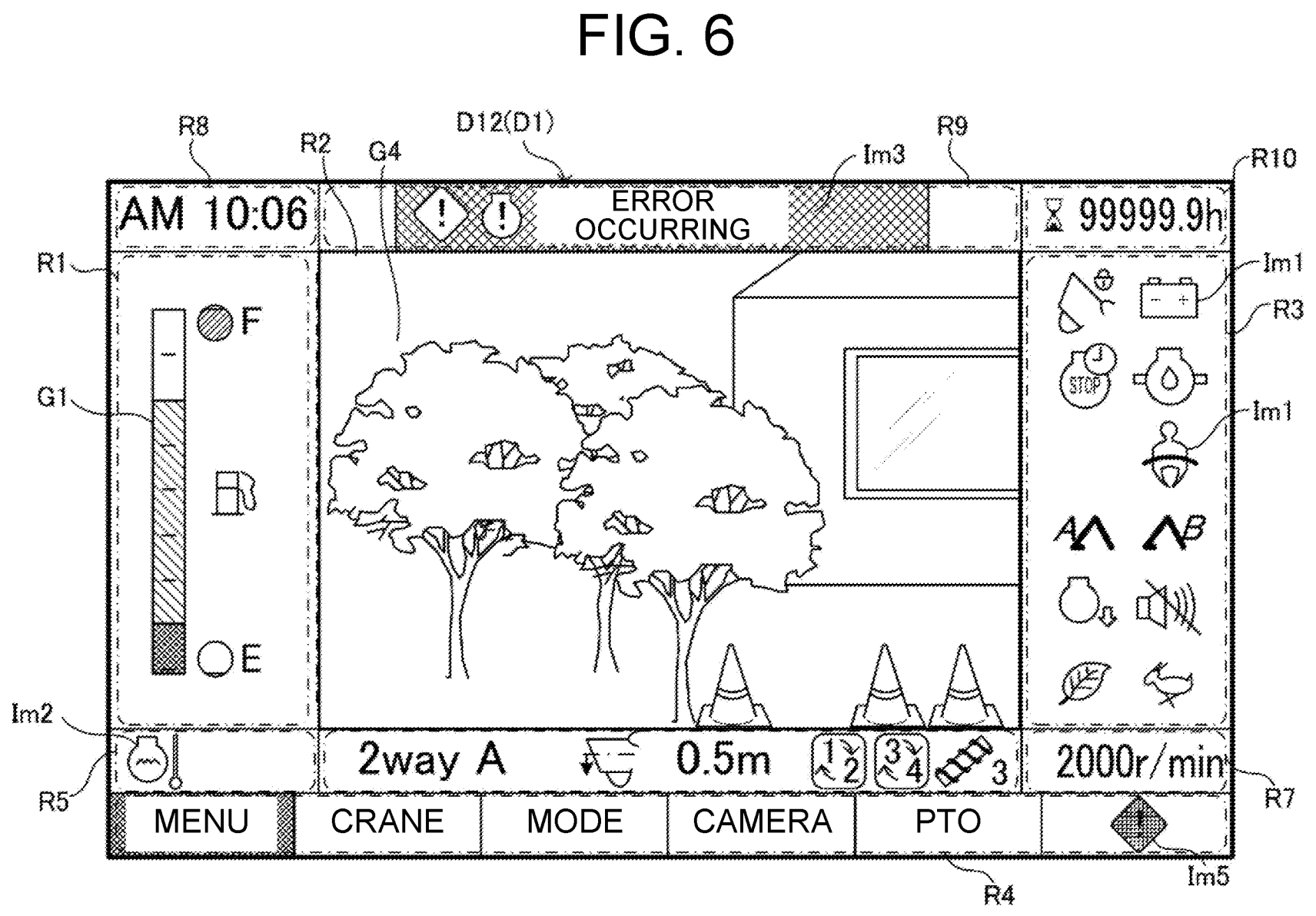

That is, the display screen D1 displayed on the display device 2 can be switched, for example, from the home screen D11 such as that shown in FIG. 5 to the camera screen D12 such as that shown in FIG. 6. Further, the display screen D1 displayed on the display device 2 can also be switched, for example, to the full display screen D13 such as that shown in FIG. 7.

The camera screen D12 shown in FIG. 6 is a screen in which only the content displaying on the switching display region R2 is changed from the home screen D11 shown in FIG. 5. That is, the contents displayed on the home screen D11 are the same as those of the camera screen D12 excluding that displayed on the switching display region R2.

The switching display region R2 of the camera screen D12 displays, as the display target information, the second information instead of the first information (the cooling water temperature information G3 and the hydraulic oil temperature information G2). Here, the second information is information including the periphery image G4 of the work machine 3. The display processing portion 13 generates the periphery image G4 in the display screen D1 (camera screen D12) based on output of the camera 36 (image data)

acquired in the image acquiring portion 12. Therefore, by the camera screen D12, a periphery (in this case, a rear side) of the work machine 3 that tends to be a blind spot for a user can be easily confirmed by the periphery image G4 displayed on the center (central area) of the display screen D1. Here, as one example, the periphery image G4 is displayed when, while the engine 37 is being activated, the release of the cutoff lever that prohibits an operation of the work machine 3, that is, the release of prohibition of the operation is conducted as a trigger.

Figure 7:
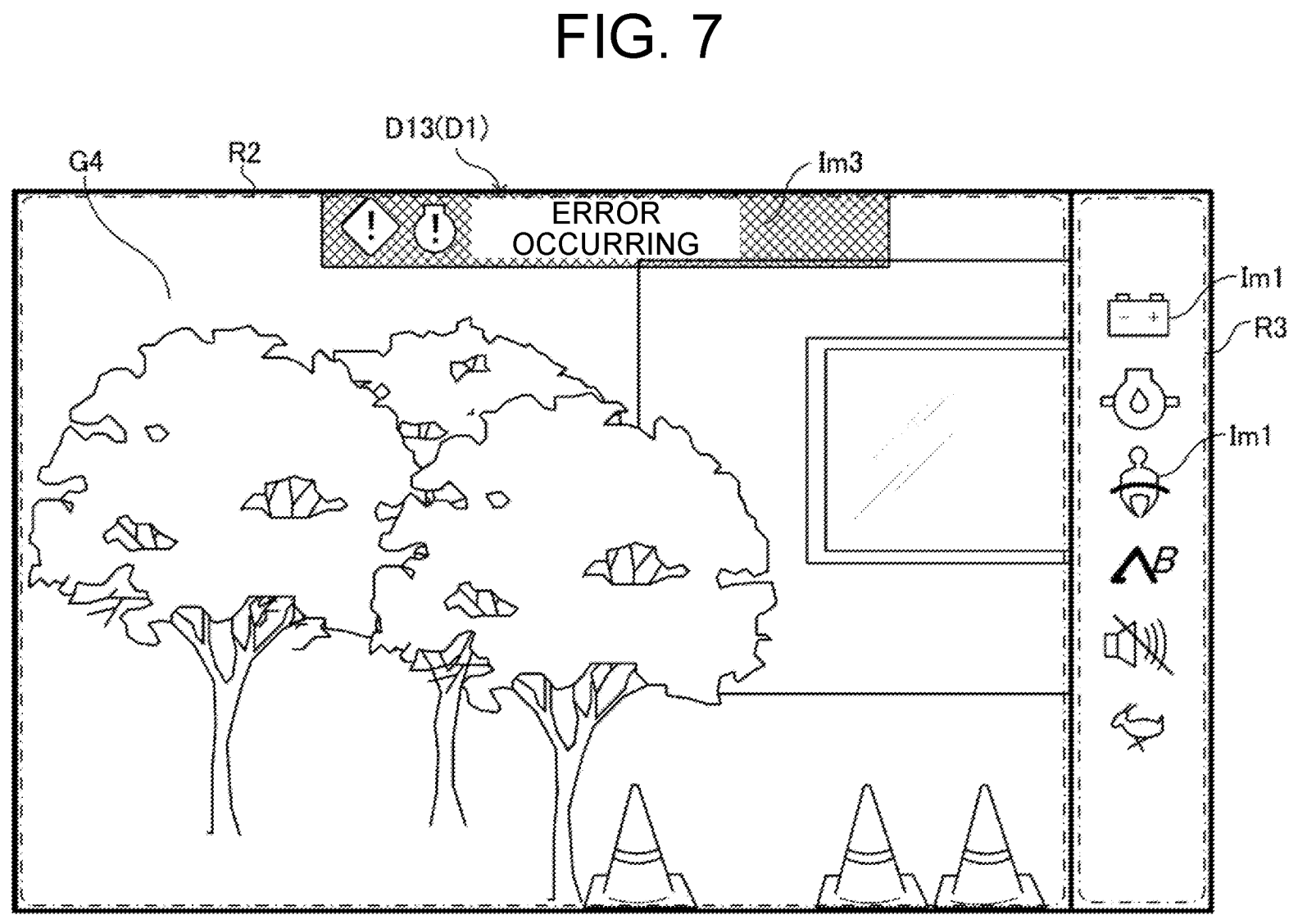

The full display screen D13 shown in FIG. 7 is a screen in which the switching display region R2 that displays the periphery image G4 is expanded with respect to the camera screen D12 shown in FIG. 6. In an example of FIG. 7, the full display screen D13 only includes two regions, the switching display region R2 and the third region R3, and the most region of the display screen D1 is the switching display region R2 and only the right end portion of the display screen D1 is the third region R3. That is, in the full display screen D13, the remaining-amount display region R1 is not displayed, and an area where the switching display region R2 is displayed is expanded so as to range from the central area to the peripheral area where, in the camera screen D12, etc., the remaining-amount display region R1 is displayed.

In short, the display processing portion 13 according to this embodiment includes a plurality of display modes including a first mode and a second mode. In the first mode, the display processing portion 13 disposes the switching display region R2 and the remaining-amount display region R1 on the central area and the peripheral area, respectively. In the second mode, the display processing portion 13 does not display the remaining-amount display region R1 and disposes the switching display region R2 so that the switching display region R2 ranges from the central area to the peripheral area. Therefore, the display processing portion 13 displays the home screen D11 and the camera screen D12 in the first mode, and displays the full display screen D13 in the second mode.

According to the above-described configuration, the display processing portion 13 can expand the display area of the switching display region R2 when the display processing portion 13 activates in the second mode, that is, when the display processing portion 13 displays the full display screen D13. Therefore, the visibility of the information displayed on the switching display region R2 is increased for a user. In this embodiment, in the full display screen D13, the periphery image G4 as the second information is mainly displayed on the switching display region R2. However, the present invention is not limited to this configuration. That is, in the full display screen D13, the first information such as the cooling water temperature information G3 and the hydraulic oil temperature information G2 may be displayed on the switching display region R2.

By the way, in the home screen D11 shown in FIG. 5, the providing information Im2 is displayed on the fifth region R5. In an example shown in FIG. 5, it is assumed a case in which an abnormal value of the cooling water temperature is sensed. That is, for example, with respect to an actuation state of each part of the work machine 3 corresponding to a variety of pictograms Im1 displayed on the third region R3, the display processing portion 13 uses output of a variety of sensors (including a cooling water temperature sensor 34 and a hydraulic oil temperature sensor 35) to determine the state of each part of the work machine 3. As one example, when the normal value of the cooling water temperature is defined as a temperature of no less than 30 degrees Celsius and no more than 110 degrees Celsius, and the cooling water temperature becomes less than 30 degrees Celsius or more than 110 degrees Celsius, the display processing portion 13 senses an abnormal value of the cooling water temperature. Then, when an abnormal value is sensed as described above, the display processing portion 13 changes the display form such as the display color of the pictogram Im1 on the third region R3 corresponding to the abnormal value and displays the providing information Im2 on the fifth region R5. Further, in an example shown in FIG. 5, a providing information Im3 such as "ERROR OCCURRING" indicating that an abnormal value is sensed is displayed on the ninth region R9.

Here, the providing information Im2, Im3 are information relating to the first information (the cooling water temperature information G3 and the hydraulic oil temperature information G2). Specifically, each of the providing information Im2, Im3 is a warning indicating that an abnormal value about the first information is sensed. Further, each of the providing information Im2, Im3 includes a pictogram (icon) indicating the first information (cooling water temperature). That is, each of the providing information Im2, Im3 includes a pictogram about the first information. Especially in this embodiment, the providing information Im2 indicates a content of an abnormal value by the displaying form of the pictogram (a display color and a size, etc.). As one example, when the cooling water temperature is lower than 30 degrees Celsius, the pictogram of the providing information Im2 is displayed in blue, and when the cooling water temperature is higher than 110 degrees Celsius, the pictogram of the providing information Im2 is displayed in red. As described above, by in the providing information Im2, Im3 including the pictograms, a user can easily understand what the providing information Im2, Im3 indicate.

Further, in an example shown in FIG. 5, the right-most item on the fourth region R4 is changed from the "SWITCH" (see FIG. 3) to a warning Im5. That is, when an abnormal value is sensed, the display processing portion 13 displays the providing information Im2, Im3, and at the same time, displays the item of the warning Im5 on the fourth region R4. In this state, for example, when the push switch 226 corresponding to the warning Im5 is operated by the user U1 (see FIG. 2), the item of the warning Im5 is operated (selected). When the item of the warning Im5 is operated, details of the currently occurring error (abnormal value) is displayed on the display screen D1.

Further, in this embodiment, as shown in FIG. 6, the providing information Im2, Im3 is also displayed on the camera screen D12 in which the second information (periphery image G4) is displayed on the switching display region R2. That is, the display processing portion 13 displays the providing information Im2, Im3 about the first information on the display screen D1 in a situation in which at least the first information is not displayed on the switching display region R2. According to the above, even in a situation in which the first information is not displayed, the information about the first information can be provided to a user by the providing information Im2, Im3. In this embodiment, the providing information Im2, Im3 is displayed not only in a situation in which the first information is not displayed (camera screen D12) but also in a situation in which the first information is displayed (home screen D11). Note that, as shown in FIG. 7, only the providing information Im3 of the providing information Im2, Im3 is displayed on the full display screen D13.

Further, in this embodiment, at least the providing information Im2 is displayed on the fifth region R5, that is, a region other than the switching display region R2. The fifth region R5 is positioned below the remaining-amount display region R1. In short, the display processing portion 13 displays the providing information Im2 on a position other than the switching display region R2 on the display screen D1. According to the above, the providing information Im2 is not overlapped with the first information and the second information, etc. displayed on the switching display region R2, and hence, the visibility of each information is increased. Further, the display processing portion 13 displays the providing information Im2 below the remaining-amount display region R1 on the display screen D1. According to the above, the providing information Im2 is not overlapped with the remaining-amount information G1 displayed on the remaining-amount display region R1, and hence, the visibility of each information is increased.

[5.2] Overall Process

Figure 8:
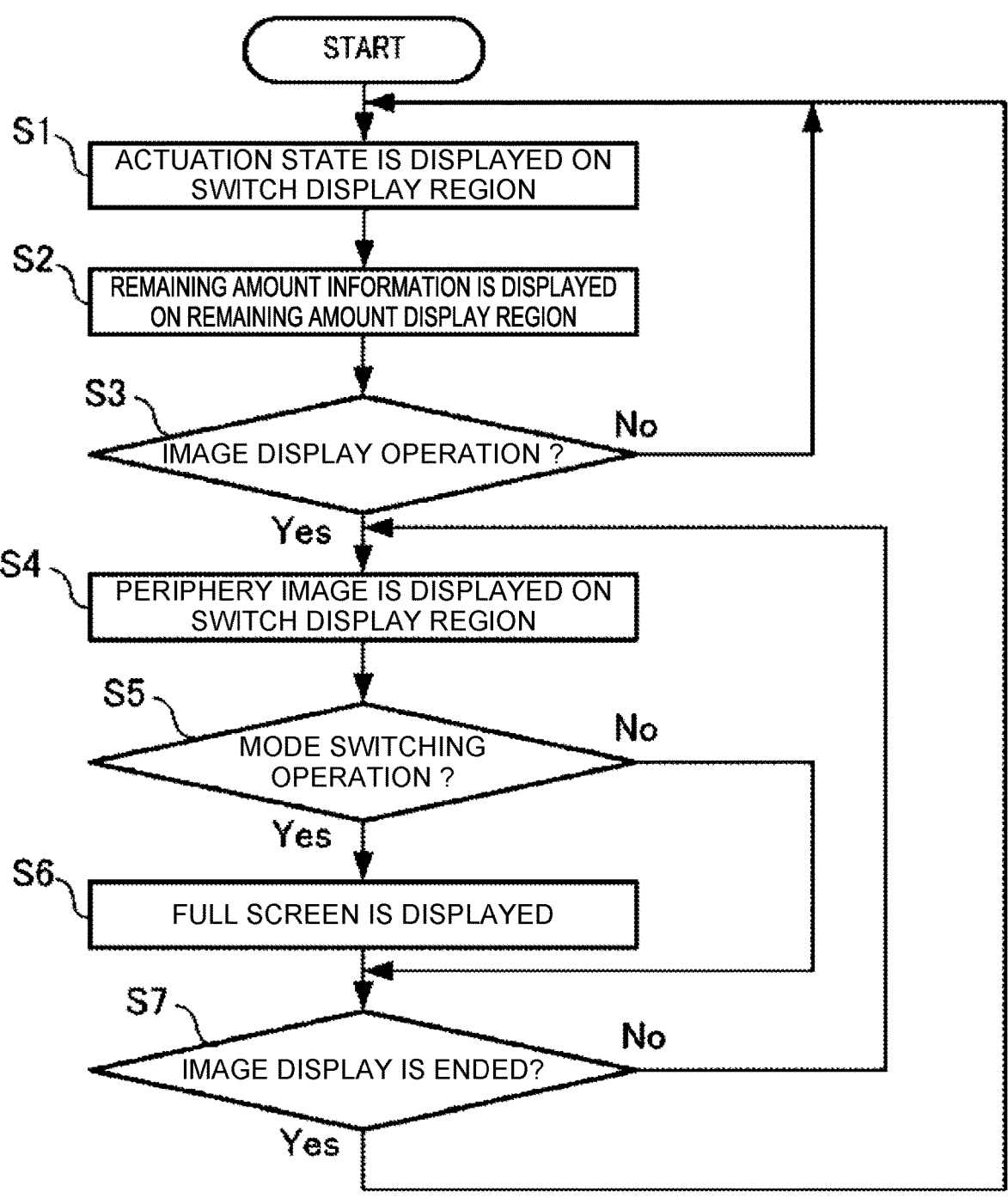
FIG. 8 is a flowchart illustrating one example of processing according to a display control method by a display control system according to the embodiment 1.

Next, the flow of an overall process according to the display control method is described with reference to FIG. 8. FIG. 8 is a flowchart illustrating one example of processing according to the display control method.

As shown in FIG. 8, the display processing portion 13 of the display control system 1 firstly displays the home screen D11 on the display device 2. That is, the display processing portion 13 displays the first information about the actuation state of the work machine 3 (for example, the cooling water temperature information G3 and the hydraulic oil temperature information G2) on the switching display region R2 of the display screen D1 (home screen D11) (S1). Further, the display processing portion 13 displays the remaining-amount information G1 on the remaining-amount display region R1 of the display screen D1 (home screen D11) (S2). In this case, when the display processing portion 13 displays the actuation state and the remaining-amount information G1, the display control system 1 uses data acquired in the data acquiring portion 11. In this situation, the display processing portion 13 observes whether an image display operation, that is, an operation (selection) of the item of "CAMERA" is conducted or not (S3). When the image display operation is not conducted (S3: No), the display processing portion 13 continues displaying the home screen D11 (S1, S2).

When the image display operation is conducted (S3: Yes), the display processing portion 13 displays the camera screen D12 on the display device 2. That is, the display processing portion 13 displays the periphery image G4 of the work machine 3 on the switching display region R2 of the display screen D1 (camera screen D12) (S4). The first acquiring process of the image data by the image acquiring portion 12 may be conducted when the periphery image G4 is displayed, that is, when the process S4 is conducted. In this situation, the display processing portion 13 observes whether a mode switching operation, that is, an operation (selection) of the item of "CAMERA" is conducted or not (S5).

When the mode switching operation is conducted (S5: Yes), the display processing portion 13 displays the full display screen D13 on the display device 2. That is, the display processing portion 13 does not display the remaining-amount display region R1 and displays the switching display region R2 of the display screen D1 on the full screen of the display screen D1 (expands the switching display region R2 to display it on the full display screen D13) (S6). On the other hand, when the mode switching operation is not conducted (S5: No), the display processing portion 13 skips the process S6 and continues displaying the camera screen D12.

Then, the display processing portion 13 observes, while the camera screen D12 or the full display screen D13 is being displayed, whether an operation to end displaying of an image, that is, an operation (selection) of the item of "CAMERA" is conducted or not (S7). When the operation to end displaying of the image is not conducted (S7: No), the display processing portion 13 continues displaying the camera screen D12 or the full display screen D13 (S4 to S6). When the operation to end displaying of the image is conducted (S7: Yes), the display processing portion 13 returns to the process S1 and displays the home screen D11 on the display device 2.

Here, a data acquiring process by the data acquiring portion 11 and an abnormal value sensing (deciding) process by the display processing portion 13 are continually (or periodically) conducted as a background process of each process of the above-described flowchart. Therefore, when an abnormal value is sensed in the abnormal value sensing process while any one of the processes in the above-described flowchart is being conducted, the display processing portion 13 displays the providing information Im2, Im3.

Note that the flowchart shown in FIG. 8 is merely an example and a process may be appropriately added or omitted, or an order of processes may be appropriately changed.

[6] Modified Example

Hereinafter, modified examples of the embodiment 1 are listed. The below-described modified examples can be applied by appropriately combining with each other.

Figure 9:
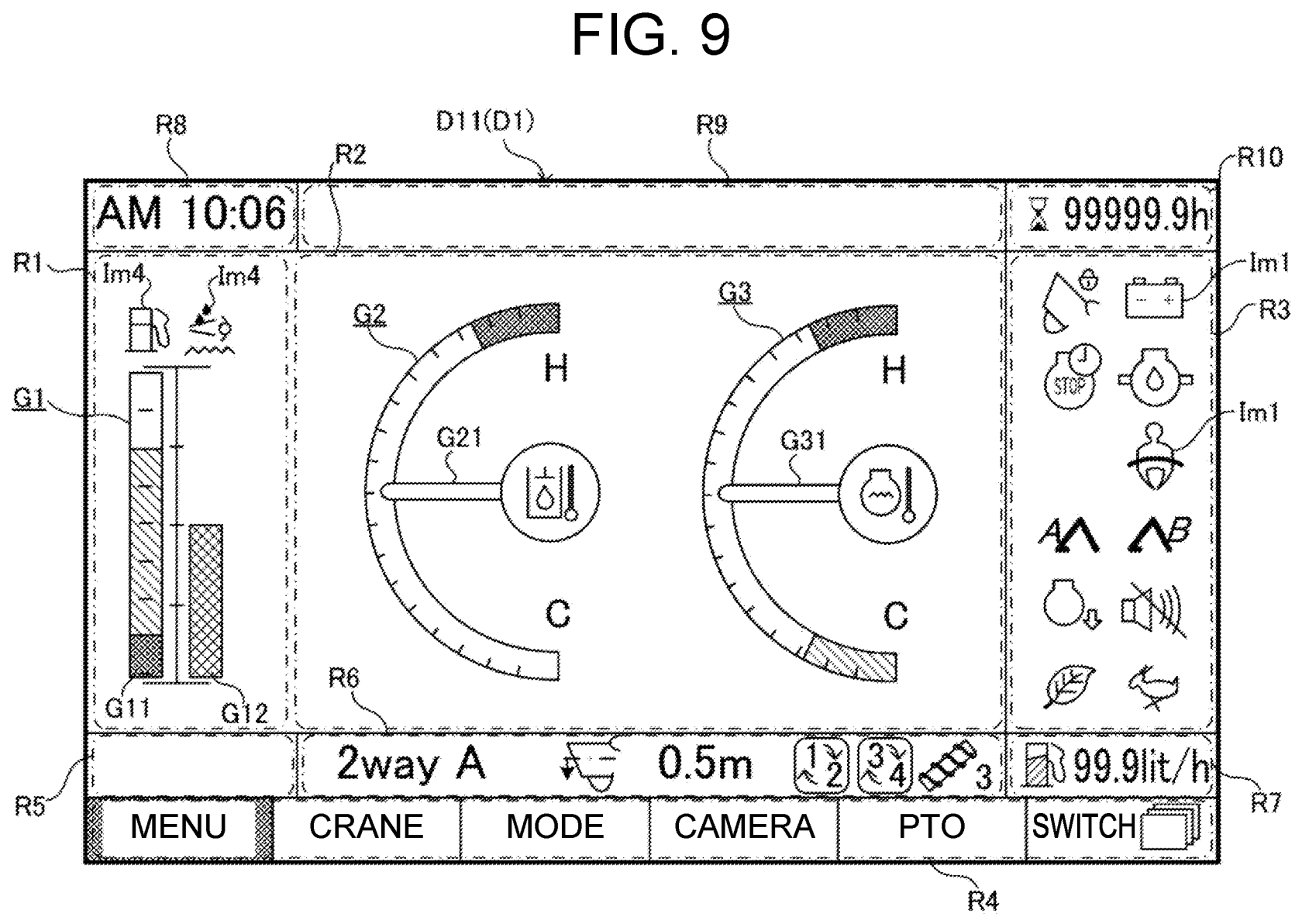

FIG. 9 shows the display screen D1 (home screen D11) displayed by the display control system 1 according to a first modified example. In this modified example, it is assumed that the engine 37 of the work machine 3 includes a urea Selective Catalytic Reduction (SCR) system. The urea SCR system removes NOx included in an exhaust gas by spraying urea solution toward the exhaust gas. In the work machine 3 configured as described above, not only fuel but also urea solution in a urea solution tank need to be appropriately supplied. According to the above, in this modified example, the remaining-amount information G1 displayed on the remaining-amount display region R1 includes urea solution remaining-amount information G12 about the remaining amount of urea solution in addition to the fuel remaining-amount information G11 about the remaining amount of fuel. Both of the fuel remaining-amount information G11 and the urea solution remaining-amount information G12 are bar graphs. Further, in this modified example, the seventh region R7 displays a fuel consumption rate.

As described above, the remaining-amount information G1 displayed on the remaining-amount display region R1 is not limited to the information including the remaining amount of fuel and may also include information about a remaining amount of a variety of observation targets. The remaining-amount information G1 may simultaneously display information about remaining amounts of a plurality of observation targets, or may separately display information about each of the remaining amounts of the plurality of observation targets. Further, for example, what the observation target includes may be automatically determined by the display processing portion 13 through the communication with the machine body 30 of the work machine 3, or may be manually set.

The display control system 1 according to this disclosure includes a computer system. The computer system is mainly configured by one or more processors and one or more memories as a hard ware. When the processor executes a program stored in the memory of the computer system, the function as the display control system 1 according to this disclosure is realized. The program may be previously stored in the memory of the computer system, may be provided via an electric communication line, or may be provided as a non-temporary recording medium such as a memory card, an optical disk, and a hard disk drive, etc. that are readable by the computer system. Further, a part or all of functional portions included in the display control system 1 may be configured by an electronic circuit.

Further, it is not an essential configuration for the display control system 1 that at least a part of functions of the display system 10 is aggregated in one single housing, and the configuration component of the display system 10 may be separately provided in a plurality of housings. On the contrary, in the embodiment 1, functions of the display system 10, etc. separately provided in a plurality of devices may be aggregated in one single housing. Further, at least a part of functions of the display control system 1 may be realized by a crowd (crowd computing), etc.

Further, the motive power source of the work machine 3 is not limited to a diesel engine and, for example, may be an engine other than a diesel engine, or may be a motor (electric motor) or a hybrid type motive power source including an engine and a motor (electric motor). When the motive power source includes an electric motor such as a motor, the motive power source is actuated by consuming an electric energy stored in a battery in addition to or instead of fuel (light oil or gasoline, etc.). In this case, for example, a State Of Charge (SOC), etc. corresponding to a remaining amount of the battery may be displayed on the display screen D1 as the remaining-amount information G1.

Further, the periphery image taken by the camera 36 is not limited to an image of the rear side of the work machine 3 and, for example, the periphery image may include an image of at least one direction of a front side, a left side, a right side, an upper side, and a lower side of the work machine 3 in addition to or instead of the image of the rear side of the work machine 3. When a plurality of cameras 36 are provided, an image displayed on the display screen D1 may be switched between, for example, an image of the rear side of the work machine 3 and an image of the front side of the work machine 3 by switching the plurality of cameras 36.

Further, the display device 2 is not limited to a dedicated device and, for example, may be a general-purpose terminal such as a laptop computer, a tablet terminal, and a smart phone, etc. Further, the display portion 21 is not limited to an aspect that directly displays the display screen D1 such as a liquid crystal display or an organic EL display and, for example, may be a configuration that displays the display screen D1 by projecting the display screen D1 such as a projector. The display region of the display portion 21 is not limited to the region longer in the lateral direction, and may be longer in the longitudinal direction.

Further, as an aspect of inputting information of the operation portion 22, an aspect other than the push switches 221 to 226, a touch panel, and an operation dial may be adopted. For example, the operation portion 22 may adopt an aspect such as a keyboard, a pointing device such as a mouse, etc., a voice input, a gesture input, or an input of an operating signal from another terminal, etc.

Further, the first information displayed on the switching display region R2 is not limited to the cooling water temperature information G3 and the hydraulic oil temperature information G2. As an example, the first information may be only one of the cooling water temperature information G3 or the hydraulic oil temperature information G2, or may include information about the activating working portion 31, etc. such as the information displayed on the sixth region R6.

Further, the above-described positions and sizes of the remaining-amount display region R1 and the switching display region R2 are merely an example and can be appropriately changed. For example, the switching display region R2 may be disposed on the peripheral area and the remaining-amount display region R1 may be disposed on the central area. Further, at least one of the remaining-amount display region R1 and the switching display region R2 may be appropriately omitted.

Embodiment 2

Figure 10:
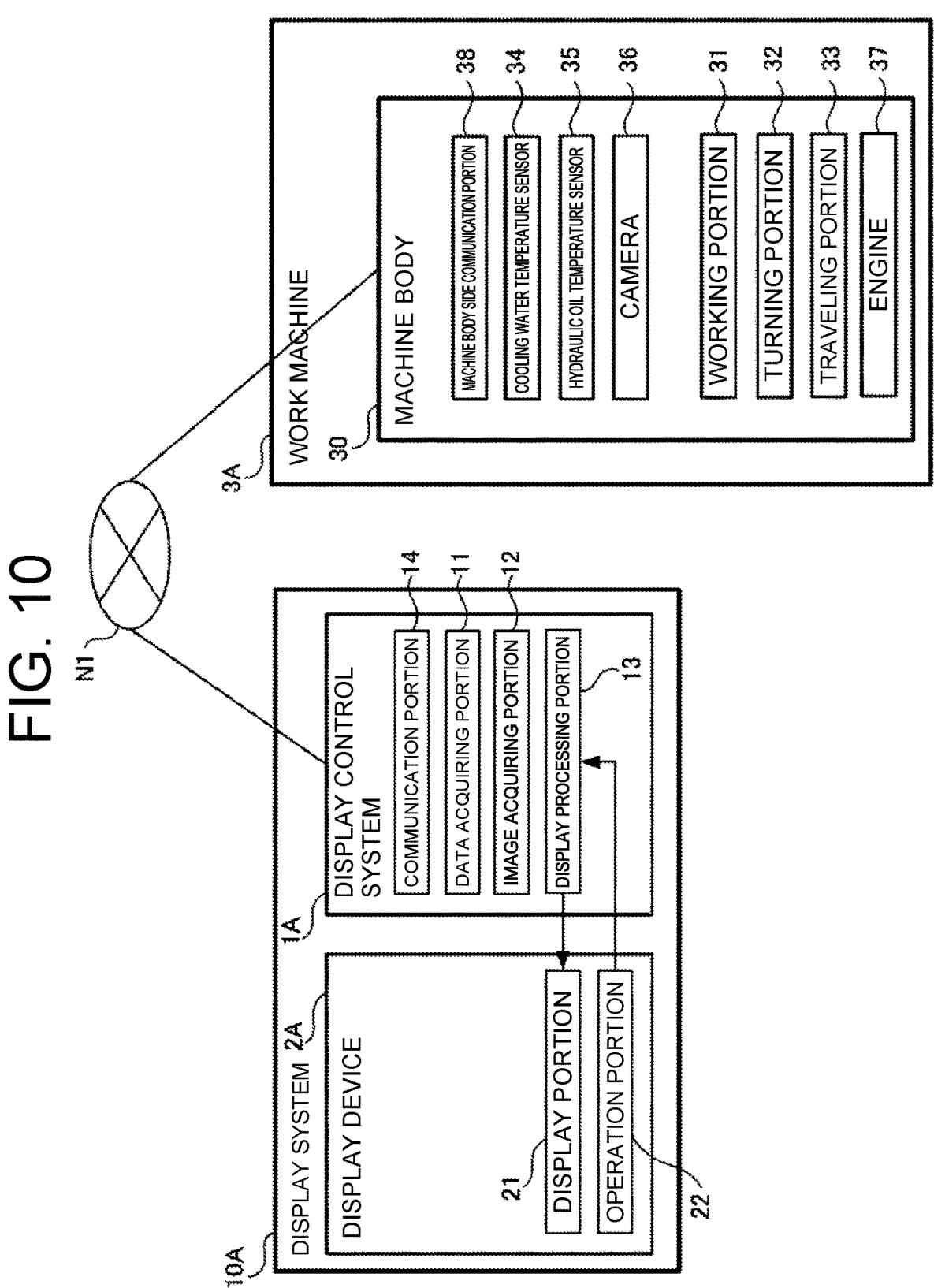
FIG. 10 is a block diagram illustrating a display system and a work machine according to an embodiment 2.

As shown in FIG. 10, the display system 10A according to this embodiment is different from the display system 10 according to the embodiment 1 in that the display system 10A is provided separately from the machine body 30 of a work machine 3A. Hereinafter, a common reference numeral is applied to a configuration same as that of the embodiment 1 and an explanation thereof is appropriately omitted.

In this embodiment, as one example, the work machine 3A moves by an automatic drive (conducts autonomous traveling). Specifically, the work machine 3A includes, for example, a position detection portion that detects a position (latitude and longitude) of the machine body 30 by using a satellite positioning system such as a Global Navigation Satellite System (GNSS) and a posture detection portion that detects a posture of the work machine 3A, etc.

The display system 10A including a display control system 1A and a display device 2A is realized by a tablet terminal, etc. disposed on an outside of the work machine 3A. In this embodiment, the display control system 1A includes a communication portion 14. The machine body 30 of the work machine 3A includes a machine body side communication portion 38. The communication portion 14 and the machine body side communication portion 38 are configured to be capable of communicating with each other via a communication network N1 such as the Internet, etc.

According to the configuration described above, when the display system 10A is provided separately from the machine body 30 of the work machine 3A, the display system 10A can make the display device 2A display the display screen D1 similar to that of the embodiment 1 by communicating with the machine body 30.

In a modified example of this embodiment, the work machine 3A is not limited to the configuration moved by the automatic drive, and may be moved by remote control of a user (operator). In this case, for example, a user may remotely control the work machine 3A while seeing the display screen D1 displayed on the display device 2A.

The configuration according to the embodiment 2 (including modified example) can be adopted by appropriately combining it with a variety of configurations (including modified example) explained in the embodiment 1.

The invention claimed is:

1. A work machine display control system comprising:
a display processing portion that makes a display device display a display screen including:
a remaining-amount display region that displays remaining-amount information about a remaining amount of an observation target that is consumed when a work machine is activated; and
a switching display region that displays display target information selected from a plurality of pieces of information including at least a first information comprising an actuation state of the work machine and a second information about the work machine so that displayed information can be switched between the plurality of pieces of information; wherein:
the switching display region is disposed on a central area including a center of the display screen,
the second information comprises a periphery image of an area around the work machine and wherein the periphery image is not overlaid with the remaining-amount information, and
the remaining-amount display region is disposed on a peripheral area that is positioned on a periphery of the central area of the display screen, wherein:
the display processing portion is further configured to switch the display target information that is displayed in the switching display region according to a state of a cutoff lever that prohibits operation of the work machine, so that, when the cutoff lever operates to release prohibition of operation of the work machine, the second information is displayed as the display target information.

2. The work machine display control system according to claim 1, wherein the display processing portion displays providing information about the first information on the display screen in a situation in which at least the first information is not displayed on the switching display region.

3. The work machine display control system according to claim 2, wherein the display processing portion displays the providing information on a position other than the switching display region on the display screen.

4. The work machine display control system according to claim 3, wherein the display processing portion displays the providing information on a position below the remaining-amount display region on the display screen.

5. The work machine display control system according to claim 2, wherein the providing information includes a pictogram about the first information.

6. The work machine display control system according to claim 1, wherein the first information is information about an actuation state of the work machine.

7. The work machine display control system according to claim 6, wherein the first information is information that indicates a value about the actuation state.

8. The work machine display control system according to claim 1, wherein the display processing portion:
has a plurality of display modes including a first mode and a second mode;
disposes the switching display region on the central area and disposes the remaining-amount display region on the peripheral area in the first mode and
does not display the remaining-amount display region and displays the switching display region so that the switching display region ranges from the central area to the peripheral area in the second mode.

9. A work machine display system comprising:
the work machine display control system according to claim 1; and
the display device that displays the display screen.

10. A work machine comprising:
the work machine display system according to claim 9; and
a machine body to which the display device is mounted.

11. A work machine display control method including making a display device display a display screen including:
a remaining-amount display region that is disposed on a peripheral area that is positioned on a periphery of a central area including a center of the display screen and displays remaining-amount information about a remaining amount of an observation target that is consumed when a work machine is activated;

a switching display region that is disposed on the central area of the display screen and displays display target information selected from a plurality of pieces of information including at least a first information comprising an actuation state of the work machine and a second information about the work machine so that displayed information can be switched between the plurality of pieces of information, wherein the second information comprises a periphery image of an area around the work machine and wherein the periphery image is not overlaid with the remaining-amount information, wherein the display processing portion is further configured to switch the display target information that is displayed in the switching display region according to a state of a cutoff lever that prohibits operation of the work machine, so that, when the cutoff lever operates to release prohibition of operation of the work machine, the second information is displayed as the display target information.

12. A work machine display control program that makes one or more processors conduct making a display device display a display screen including:

a remaining-amount display region that is disposed on a peripheral area that is positioned on a periphery of a central area including a center of the display screen and displays remaining-amount information about a remaining amount of an observation target that is consumed when a work machine is activated;

a switching display region that is disposed on the central area of the display screen and displays display target information selected from a plurality of pieces of information including at least a first information comprising an actuation state of the work machine and a second information about the work machine so that displayed information can be switched between the plurality of pieces of information, wherein the second information comprises a periphery image of an area around the work machine and wherein the periphery image is not overlaid with the remaining-amount information, wherein the display processing portion is further configured to switch the display target information that is displayed in the switching display region according to a state of a cutoff lever that prohibits operation of the work machine, so that, when the cutoff lever operates to release prohibition of operation of the work machine, the second information is displayed as the display target information.

* * * * *